United States Patent [19]
Van Vuuren et al.

[11] Patent Number: 6,053,843
[45] Date of Patent: Apr. 25, 2000

[54] DRIVE DEVICE PROVIDED WITH TORQUE-LIMITING MEANS

[75] Inventors: Sebastiaan Wijnandus Marie Van Vuuren, Teteringen; Hendrikus Adrianus Arnoldus Wilhelmina Pelders, Nuland, both of Netherlands

[73] Assignee: Van Doorne's Transmissie B.V., Tilburg, Netherlands

[21] Appl. No.: 09/124,244

[22] Filed: Jul. 29, 1998

[30] Foreign Application Priority Data

Jul. 29, 1997 [NL] Netherlands ............................ 1006684

[51] Int. Cl.[7] ................................................. F16H 61/00
[52] U.S. Cl. ............................... 477/45; 477/46; 477/48; 477/109
[58] Field of Search .................... 477/45, 46, 48, 477/109

[56] References Cited

U.S. PATENT DOCUMENTS

| | | | |
|---|---|---|---|
| 3,913,419 | 10/1975 | Sale et al. ............................ | 477/107 X |
| 4,515,040 | 5/1985 | Takeuchi et al. . | |
| 4,577,737 | 3/1986 | Niikura et al. . | |
| 4,582,141 | 4/1986 | Van Der Lely ....................... | 477/107 X |
| 4,665,773 | 5/1987 | Hiramatsu et al. . | |
| 4,860,863 | 8/1989 | Hayashi . | |
| 5,042,325 | 8/1991 | Sawasaki et al. . | |
| 5,186,081 | 2/1993 | Richardson et al. ................. | 123/383 X |
| 5,427,579 | 6/1995 | Kanehara et al. . | |
| 5,457,633 | 10/1995 | Palmer et al. ......................... | 477/30 X |
| 5,803,862 | 9/1998 | Ochiai et al. .............................. | 477/45 |

FOREIGN PATENT DOCUMENTS

| | | |
|---|---|---|
| 0 328 166 | 7/1992 | European Pat. Off. . |
| 0 436 974 | 5/1994 | European Pat. Off. . |
| 0 446 497 | 9/1994 | European Pat. Off. . |

*Primary Examiner*—Khoi Q. Ta
*Attorney, Agent, or Firm*—Young & Thompson

[57] ABSTRACT

A drive device for an engine-driven load, which in the drive direction successively includes an engine, a torque converter with an input shaft and an output shaft, and a continuously variable transmission unit with a primary shaft and a secondary shaft, between which torque can be transmitted with the aid of friction forces. The nominal torque which can be generated by the combination of engine and torque converter on the primary shaft of the transmission unit is greater than the maximum slipping torque of the transmission unit. The device is provided with devices which act on parts of the drive device in such a manner that the torque which can actually be generated in operation by the combination of engine and torque converter on the primary shaft of the transmission unit is limited. The limited level for the torque is controlled in such a manner that the torque generated is at most equal to the maximum slipping torque of the transmission unit.

12 Claims, 4 Drawing Sheets

DRIVE DEVICE PROVIDED WITH TORQUE-LIMITING MEANS

BACKGROUND OF THE INVENTION

The invention relates to a drive device for an engine-driven load, in particular for a vehicle, which in the drive direction successively comprises an engine, a torque converter with an input shaft and an output shaft, and a continuously variable transmission unit with a primary shaft and a secondary shaft, between which torque can be transmitted with the aid of friction forces.

DESCRIPTION OF THE RELATED ART

A drive device of this nature is known from European Patent EP-A-0.328.166. The continuously variable transmission unit is of the drive belt/pulley type and is provided with a primary pulley which is arranged on the primary shaft and a secondary pulley arranged on the secondary shaft. A drive belt is arranged between the pulleys for transmitting torque. Each of the pulleys comprises two conical discs, at least one of which can be displaced axially with the aid of displacement means. The axial position of the displaceable discs determines the radial position of the drive belt between the discs of the primary and the secondary pulley and hence the transmission ratio of the transmission unit. By operating the displacement means of the two pulleys in such a manner that they are adapted to one another, both the radial position of the drive belt and the clamping force which the discs exert on the drive belt are controlled.

The maximum torque which can be transmitted by the drive belt in the direction from the primary shaft to the secondary shaft is dependent both on the maximum permissible clamping force and on the transmission ratio. The maximum permissible clamping force is limited by the maximum permissible load on the drive belt, which is dependent on the materials properties and the design of the drive belt. Both the clamping force and the torque transmitted contribute to the total load on the drive belt.

If the drive belt is made of metal, the maximum permissible drive belt load can be derived from the fatigue curve of the drive belt. The fatigue curve indicates the relationship between the maximum permissible load on the drive belt and the number of load charges in the drive belt. The number of load changes in the drive belt is proportional to the number of revolutions of the drive belt and thus also to the number of revolutions of the primary shaft of the transmission unit. In the latter case, the proportionality factor is dependent on the transmission ratio of the transmission unit. For an increasing number of revolutions of the drive belt, the fatigue curve initially presents a falling characteristic. The characteristic then flattens out until the maximum permissible load has reached an approximately constant, and therefore minimum value.

Partly due to the fact that the number of revolutions of the drive belt for each transmission ratio of the transmission unit generally varies considerably during use of the drive device, the maximum permissible drive belt load is dependent on the transmission ratio. The total number of revolutions of the drive belt during the service life of the drive device is dependent on the operating conditions in which the drive device is used. Therefore, for reliability's sake, the drive belt loads which are actually used in the known design are considerably lower Fan the maximum permissible loads.

If the torque on the primary shaft of a continuously variable transmission unit having a primary and a secondary shaft, between which torque can be transmitted with the aid of frictional forces, exceeds the maximum transmittable torque of the transmission unit, a driving element, for example a pulley, will move with respect to a driven element, for example the drive belt. The maximum transmittable torque is therefore also known as the maximum slipping torque of the transmission unit.

In the known design, the drive device is dimensioned in such a way that the torque which a drive device can nominally generate on the primary shaft of the transmission unit is always less than the maximum slipping torque of the transmission unit. Except for the presence of gear reductions and the like, the torque which can nominally be generated by the drive device on the primary shaft of the transmission unit is approximately equal to the nominal engine torque multiplied by the nominal torque conversion factor of the torque converter. The nominal engine torque is defined here as the maximum torque which can be generated by the engine and the nominal torque conversion factor of the torque converter is defined as the torque conversion factor in the situation in which the rotational speed of the input shaft is greater than zero and in which the rotational speed of the output shaft is equal to zero. This torque which can nominally be generated is only generated if the output shaft of the torque converter is locked while the fuel supply to the engine is at the maximum level: the so-called "full stall" state. In practice the rotational speed of the engine during full stall is usually lower than the rotational speed at which the engine generates the nominal engine torque. Therefore the engine generates somewhat less torque than said nominal engine torque during full stall. However, usually the difference between said engine torque's is quite small and the full stall torque can be approximated by multiplying said nominal engine torque and said nominal torque conversion factor.

There are disadvantages associated with the known design. Firstly, the drive device has to be dimensioned for the torque which can nominally be generated by the combination of engine and torque converter, while this torque is actually only generated in highly exceptional circumstances during normal use, Secondly, in the known design, owing to the operating circumstances, which vary considerably and are therefore difficult to predict, the drive belt load which is actually employed is considerably lower than the maximum permissible load,

SUMMARY OF THE INVENTION

The object of the invention is to eliminate these drawbacks, or at least to substantially overcome them, and more generally to provide an improved or alternative drive device. According to the invention, this is achieved in a drive device wherein the nominal torque which can be generated by the combination of engine and torque converter on the primary shaft of the transmission unit is greater than the maximum slipping torque of the transmission unit and wherein the drive device is provided with limiting means which act on parts of the drive device in such a manner that the torque which can actually be generated in operation by the combination of engine and torque converter on the primary shaft of the transmission unit is limited. Said torque is in this case limited to a level which is related to the maximum slipping torque of the transmission unit. Preferably the drive device is dimensioned such that the torque, which is generated by the combination of engine and torque converter on the primary shaft of the transmission unit during full throttle acceleration, is approximately equal to said maximum slipping torque. In this manner the number of situations in which the torque is actively limited by the limiting means is kept to a minimum. According to a designers rule of thumb, said torque generated during full throttle acceleration is approximately equal to the square root of the nominal torque conversion factor times the nominal engine torque. The actual torque conversion factor decreases with increasing rotational speed of the output shaft, which means that the torque generated on the primary shaft of the transmission unit decreases during acceleration of the load. At a given speed of the load the torque conversion factor has become low enough to make it impossible for the combination of engine and torque converter to generate a torque which is larger than said maximum slipping torque. At this point said limiting means may be deactivated without risking belt slip. According to a particular development of the invention, the limit level is variable. The limit level can then be set as a function of one or more parameters. Examples of suitable parameters are the surrounding temperature, the transmission ratio of the transmission unit, the rotational speed of the engine, the acceleration of the primary shaft of the transmission unit and the number of revolutions of this shaft. If the limit level is dependent on the number of revolutions of the primary shaft, the level can be controlled in such a manner that it falls in the event of the number of revolutions of a drive belt increasing. The fall of the limit level can be related to the fatigue curve of the drive belt.

A drive device according to the invention has the advantage that the device can be utilized optimally. The drive device can be utilized efficiently due to the fact that the drive device can be provided with an engine with a high power and/or with a torque converter with a high torque conversion factor and/or with a continuously variable transmission unit which can be produced inexpensively. The design also has the advantage that the difference between the drive belt load which is actually used and the maximum permissible drive belt load is reduced, which is of benefit to the performance of the transmission unit. A vehicle equipped with a drive device according to the invention exhibits optimum dynamic performance, owing to the high torque which is available on the primary shaft of the transmission unit and/or the low weight of the transmission unit. Moreover, if a torque converter with a larger torque conversion factor is employed, the adjustment range of transmission ratios of the total drive device is increased. As a result, the transmission unit can be of reduced size, or an engine with a small speed range can be employed. In addition, the transmission unit can be of less expensive design, since, if measures according to the invention are used, it does not have to be dimensioned for the torque which can nominally be generated by the combination of engine and torque converter, but for a limit level for the generated torque which can be chosen to be significantly lower. Furthermore, the drive device will, continue to function optimally even in unusual circumstances, such as the regular use of a motor vehicle provided with the drive device in a mountainous area.

In the event of normal use of the drive device, the drive belt performs relatively few revolutions in a transmission ratio associated with the lowest rotational speeds of the secondary shaft of the transmission unit. Transmission ratios of this nature are used in particular during acceleration of the secondary shaft and during the said "full stall" state. Since in this case the torque on the primary shaft reaches the highest levels, according to the invention the torque which can actually be generated by the combination of engine and torque converter on the primary shaft is preferably limited to a level which is related to the maximum slipping torque of the transmission unit when the latter is set to the transmission ratio associated with the lowest possible rotational speed of the secondary shaft.

According to the invention, the limiting means may comprise a clutch in the drive device which is controlled in such a manner that it slips before the torque generated by the combination of engine and torque converter on the primary shaft of the transmission unit exceeds said limit level.

The limiting means may also comprise a torque converter lockup clutch of the torque converter. By closing the torque converter lockup clutch to a greater or lesser extent, a larger or smaller proportion of the instantaneous engine torque is generated without torque multiplication on the primary shaft. The remainder of the engine torque is generated by the torque converter with torque multiplication on the primary shaft. This makes it possible to adjust the torque which can be generated on the primary shaft of the transmission unit to a value between the instantaneous engine torque and this torque multiplied by the instantaneous torque conversion factor.

In the event of using a torque converter with an adjustable impeller and/or turbine, the limiting means can act on the adjustment mechanism, so as to affect the torque conversion factor of the torque converter. By reducing or increasing the current torque conversion factor, the instantaneous engine torque is increased by a smaller or greater factor. In this way, it is possible to adjust the torque which can be generated on the primary shaft of the transmission unit between the instantaneous engine torque multiplied by, on the one hand, the minimum torque conversion factor to be adjusted to and, on the other hand, the maximum torque conversion factor to be adjusted to.

According to the invention, the limiting means can act on the fuel supply to the engine, so that the torque generated by the engine is affected. The fuel supply is then controlled in such a manner that the torque generated by the combination of engine and torque converter on the primary shaft of the torque converter does not exceed the limit level.

It should be noted that European Patent EP-A-0.446.947 has disclosed a device in which control means are accommodated in the drive device, which control means adjust the maximum torque on the primary shaft of the transmission unit The device which is known from this document aims to protect the transmission unit against torque fluctuations, which can propagate in the drive device counter to the drive direction. The control means are designed as a hydraulically operated disc clutch. The level of hydraulic pressure at which the disc clutch is actuated has an effect on the maximum torque which can be transmitted by the clutch. Furthermore, it should be noted that the United States patent publication U.S. Pat. No. 5,042,325 discloses a control system for a continuously variable transmission unit, wherein during an emergency situation, characterized by a loss in hydraulic pressure of the transmission fluid, the torque generated on the primary shaft of the transmission unit is limited by means of electronic engine control means, However, both said known devices aim at preventing too high a torque from entering the transmission unit, thereby protecting the drive device against unpredictable circumstances. The present invention, however, aims at improving the overall performance of a drive device. Furthermore, the present invention differs from the known devices in that it enables the use of combination of engine and torque converter which can nominally generate a torque higher than the maximum slipping torque of the transmission unit.

According to the invention, the limiting means may be partly or fully integrated in the engine control, in the transmission control or, if these two are designed as an integrated control, are incorporated in the control system of the drive device.

BRIEF DESCRIPTION OF THE DRAWINGS

The invention will be explained in more detail in the form of a non-limiting exemplary embodiment, with reference to the following figures, in which.

DESCRIPTION OF THE PREFERRED EMBODIMENT

Figure 1:
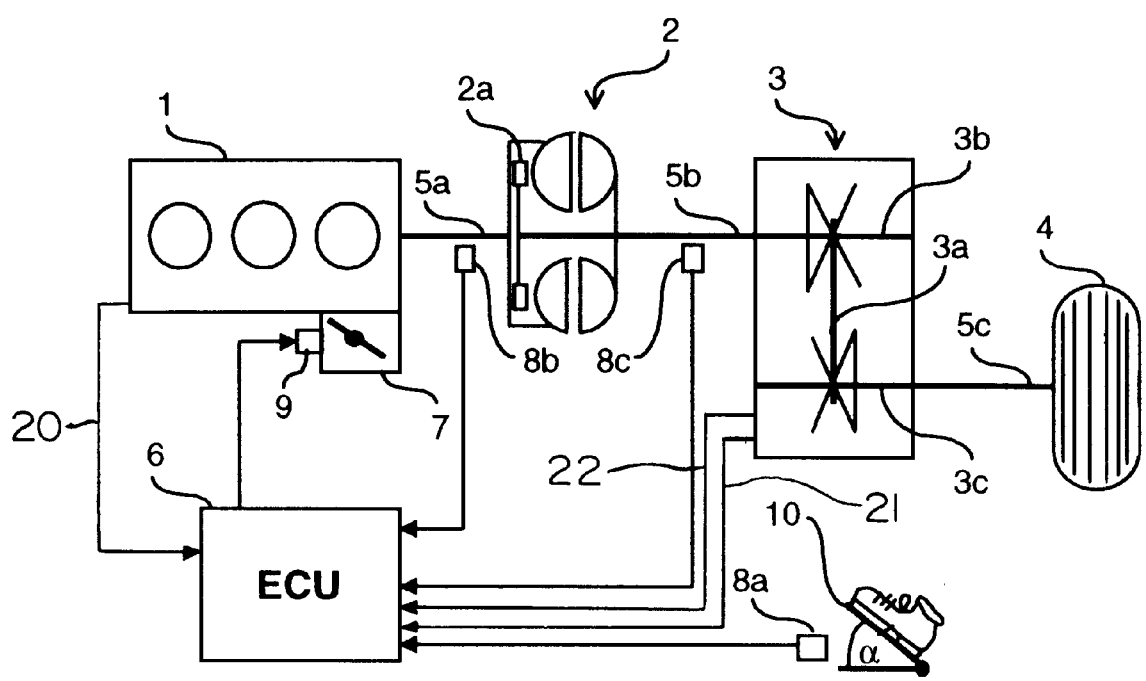
FIG. 1 shows an embodiment of a drive device according to the invention.

The drive device illustrated in FIG. 1 comprises an engine 1, a torque converter 2, a continuously variable transmission unit 3 with a primary shaft 3b and a secondary so 3c, and a load 4. The load 4 is depicted as a driven wheel of a motor vehicle. To simplify the exemplary embodiment, no additional reductions are incorporated in the drive device. The crankshaft of the engine 1 is coupled to the input shaft 5a of the torque converter 2. The rotational speed of the engine Ne is then equal to the rotational speed Ni of the input shaft 5a of the torque converter. The torque converter 2 has an output shaft 5b which is connected to the primary shaft 3b of the transmission unit 3. The rotational speed Nu of the output shaft 5b of the torque converter is then equal to the rotational speed Np of the primary shaft 3b. Since in this example Ne is equal to Ni and Nu is equal to Np, the rotational speeds in question will be referred to below merely as Ne and Np, respectively. The secondary shaft 3c of the transmission unit 3 is connected to the load 4 via the shaft 5c.

The limiting means 6,8 and 9 are of electronic design and comprise the measurement means 8b and 8c for detecting the rotational speed of the shaft 5a, i.e. Ne, and the rotational speed of the shaft 5b, i.e. Np, respectively. The limiting means 6,8 and 9 also comprise the measurement means 8a for detecting the position α of the accelerator pedal 10. The position α of the accelerator pedal 10 defines the fuel supply β to the engine 1 and hence for the torque which is generated by the engine 1 on the input shaft 5a of the torque converter 2. Sensors for measuring said three parameters are often already present in the conventional drive device, so that the signals in question can be obtained easily. The limiting means 6,8 and 9 furthermore comprise signal-processing means 6, which in the figure are depicted as the electronic control unit or ECU. Via the actuation means 9, the limiting means 6,8 and 9 can limit the fuel supply β to the engine 1 and hence also the torque Tm generated by the engine 1. In this example, the actuation means 9 control the extent to which the throttle valve 7 opens, which throttle valve determines the fuel supply β to the engine 1.

Due to the fact that the limiting means 6,8 and 9 determine a suitable level of opening for the throttle 7, it is ensured that the torque Tp generated on the primary shaft 3b does not exceed the maximum slipping torque Ts of the transmission unit 3.

The limit level (Tg) is also dependent on operating conditions including the temperature of the transmission oil 20, the transmission ratio of the transmission unit 21, the rotational speed of the engine (Ne) 8b, the acceleration of the primary shaft 22, and the number of revolutions (n) of the primary shaft. These conditions may be obtained by conventional means.

Figure 2:
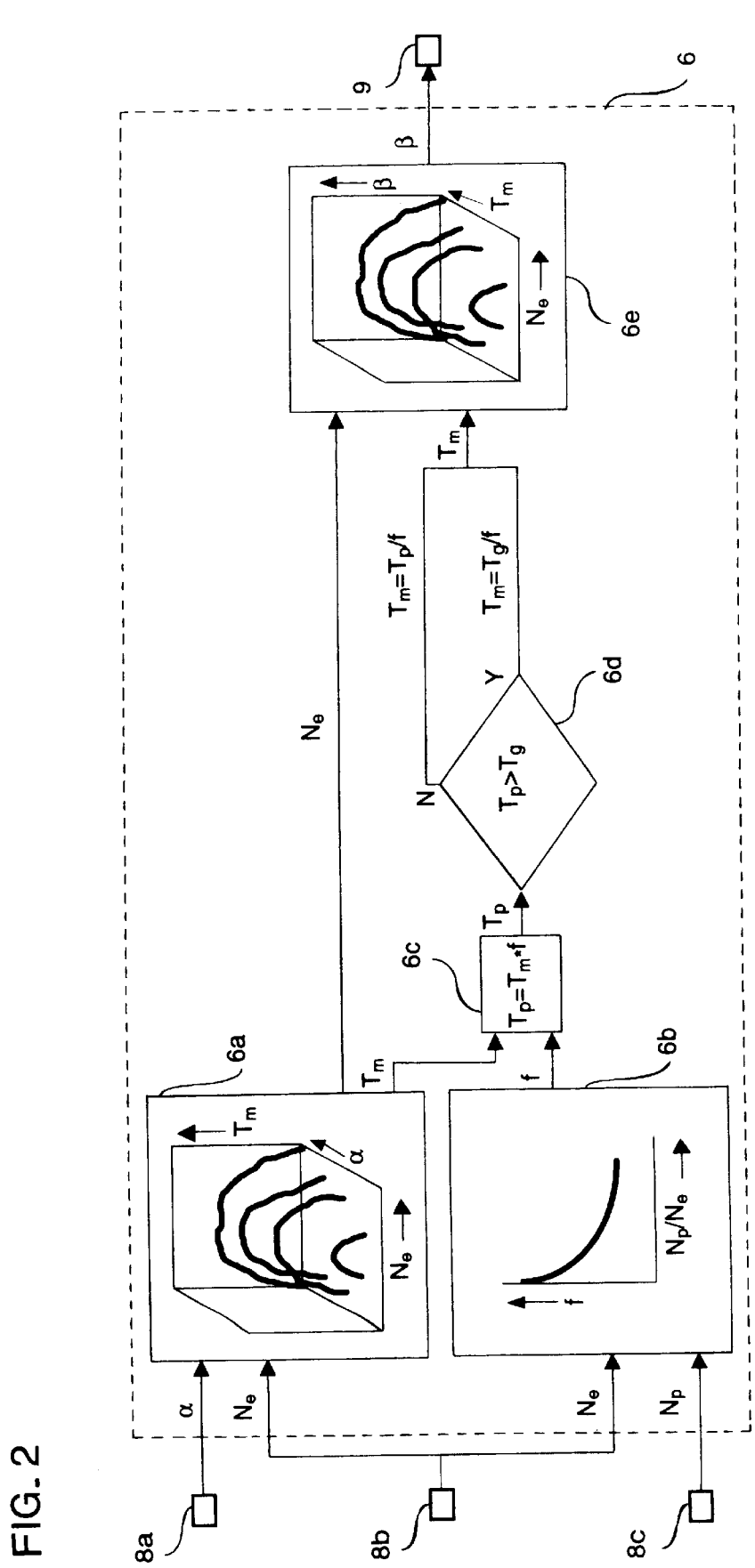
FIG. 2 shows a diagrammatic depiction of an embodiment of the signal-processing means.

An embodiment of the signal-processing means 6 is illustrated diagrammatically in FIG. 2. The signal-processing means 6 fulfill a number of functions, as illustrated by the blocks 6a to 6e inclusive. Block 6a comprises a representation of an engine characteristic graph in which the torque Tm generated by the engine 1 is established as a function of the engine speed Ne and position α of the accelerator pedal 10. With the aid of the measurement signals which are representative of the engine speed Ne and of the position α of the accelerator pedal 10, the torque Tm generated by the engine 1 is determined in block 6a. In some cases, a signal representative of this torque can be obtained directly from the engine control. Block 6b comprises a representation of the characteristic of the torque converter 2, in which the torque conversion factor f is established as a function of the quotient of the rotational speed Ne of the input shaft 5a and the rotational speed Np of the output shaft 5b of the torque converter 2. With the aid of the measurement signals which are representative of the engine speed Ne and of the rotational speed Np of the primary shaft 3b of the transmission unit 2, the torque conversion factor f of the torque converter 2 is established in block 6b. In block 6c, the torque Tp generated on the primary shaft 3b is determined with the aid of the torque Tm generated by the engine 1 and the torque conversion factor f. In block 6d, the torque Tp generated on the primary shaft 3b is compared with a limit level Tg for that torque using the outputs Y and N. If the torque Tp generated on the primary shaft 3b does not exceed the limit level Tg, the torque Tm generated by the engine 1 is equated, via output N, to the quotient of the torque Tp generated on the primary shaft 3b and torque conversion factor f. If the torque Tp generated on the primary shaft 3b is greater than or equal to the limit level Tg, the torque Tm generated by the engine 1 is equated, via output Y, to the quotient of the limit level Tg and the torque conversion factor f. Finally, in block 6e, with the aid of the torque Tm generated by the engine 1, the engine speed Ne and an engine characteristic graph in which the torque Tm generated by the engine 1 is established as a function of engine speed Ne and the level of fuel supply β, a suitable level of fuel supply β is defined.

In the exemplary embodiment illustrated in FIG. 2, the representations of the engine characteristic graph and the characteristic of the torque converter are stored in an electronic memory, More particularly, said representations may also be stored as an algorithm or in hydraulic or mechanical form. In some cases, a signal which is representative of the torque Tm generated by the engine 1 can be obtained from the (electronic) engine control. It is also possible to determine the torque Tp generated on the primary shaft 3b directly with the aid of a torque meter on the output shaft 5b of the torque converter 2.

Figure 3A:
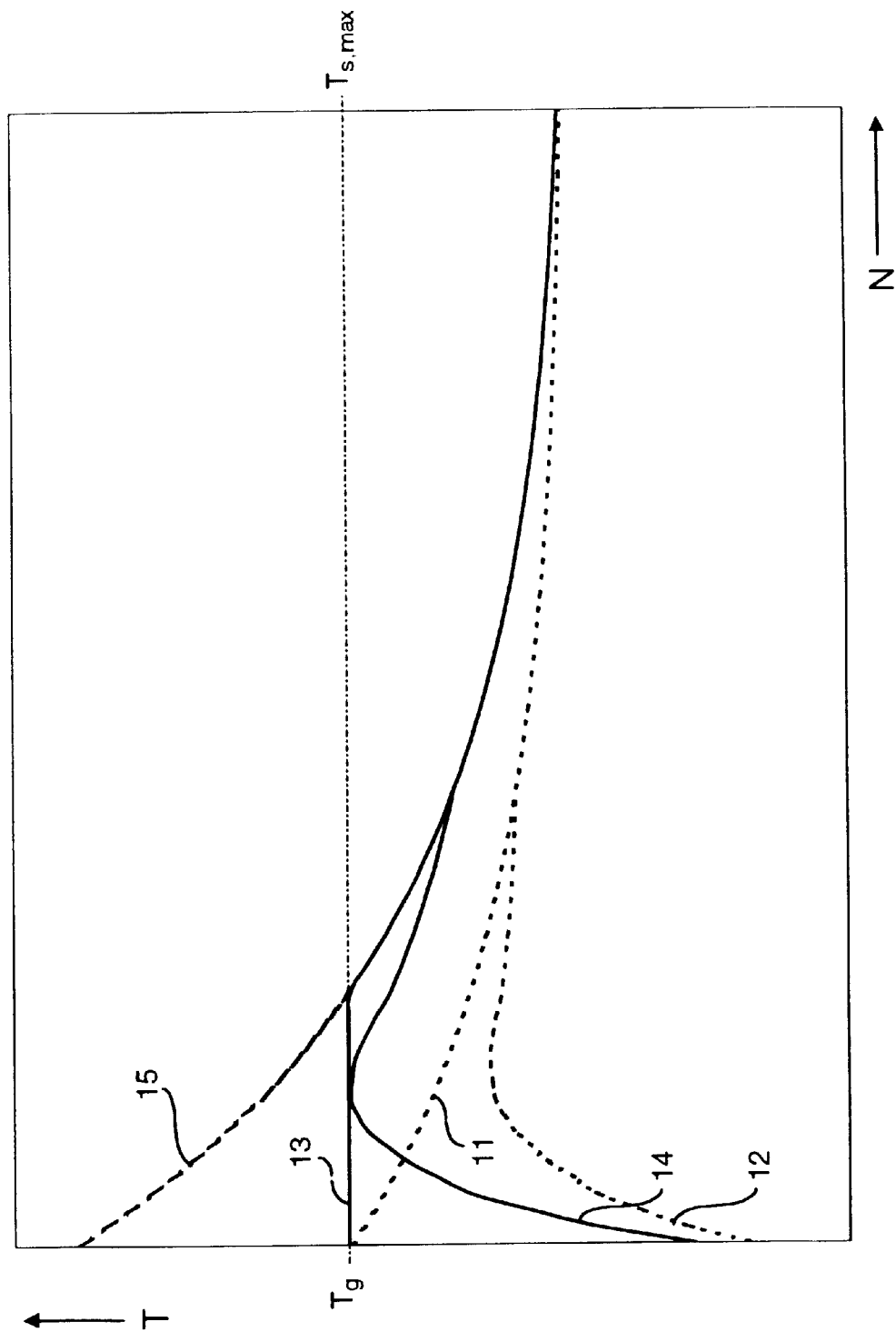
FIG. 3a shows a graph which diagrammatically illustrates a curve of the torque on the primary shaft as a function of the rotational speed of the said shaft for acceleration from standstill, for a drive device provided with limiting means according to the invention.

FIG. 3a shows a graph in which a torque T is shown on the vertical axis and a rotational speed N on the horizontal axis. Dotted curves 11 and 12 show the relationship between the torque Tp generated by the combination of engine 1 and torque converter 2 on the primary shaft 3b and the rotational speed Np of the said shaft 3b for a drive device according to the prior art. In the event of acceleration from the "full stall" state of the drive device, in which the output shaft 5b of the torque converter 2 is locked and at the same time the fuel supply β to the engine 1 is at the maximum level, the torque Tp generated on the primary shaft 3b will follow the curve 11. In this case, the transmission unit 3 is dimensioned in such a manner that the maximum slipping torque Ts,max of the transmission unit 3 is at least equal to the torque Tp,nom which can nominally be generated on the primary shaft 3b. Acceleration from the stationary state of the drive device, in which the output shaft 5b is not locked, leads to the torque Tp which is generated on the primary shaft 3b of the transmission unit 3 following curve 12. This has the result that in the event of acceleration from the said stationary state the transmission unit 3 is not utilized optimally.

The present invention is aimed at achieving optimum use of this nature by employing electronics and measurement and control means in such a manner that a torque converter 2 with an increased torque conversion factor f can be used. The curves 13 and 14 illustrate the profile of the torque Tp generated on the primary shaft 3b of the transmission unit 3 during acceleration from the "full stall" state. Without the limiting means 6,8 and 9 according to the invention, the torque Tp generated on the primary shaft 3b of the transmission unit 3 would follow the curve 15 which is illustrated as a dashed line. This situation is undesirable, since the torque Tp,nom which can nominally be generated on the primary shaft 3b exceeds the maximum slipping torque Ts,max of the transmission unit 3. If the drive device is provided with the limiting means 6,8 and 9 according to the invention, the torque Tp generated on the primary shaft 3b of the transmission unit 3 can be limited in such a manner that this torque follows the curve 13. In accordance with FIG. 3a, the limit level Tg for the said torque is constant. The limit level Tg is related to the maximum slipping torque Ts,max of the transmission unit 3 so that the torque Tp generated by the combination of engine 1 and torque converter 2 on the primary shaft 3b cannot exceed the maximum slipping torque Ts,max. As a result, it is possible to dimension the drive device in such a manner that the maximum torque Tp which can be generated on the primary shaft of the transmission unit 3 in the event of acceleration from the stationary state is equal to the maximum slipping torque Ts,max. The acceleration from the stationary state for a drive device provided with the control means 6,8 and 9 according to the invention is illustrated by curve 14. During acceleration, a drive device of this kind can provide a considerably higher torque than a comparable drive device according to the prior art, The dynamic performance of the drive device according to the invention is correspondingly greater.

Figure 3B:
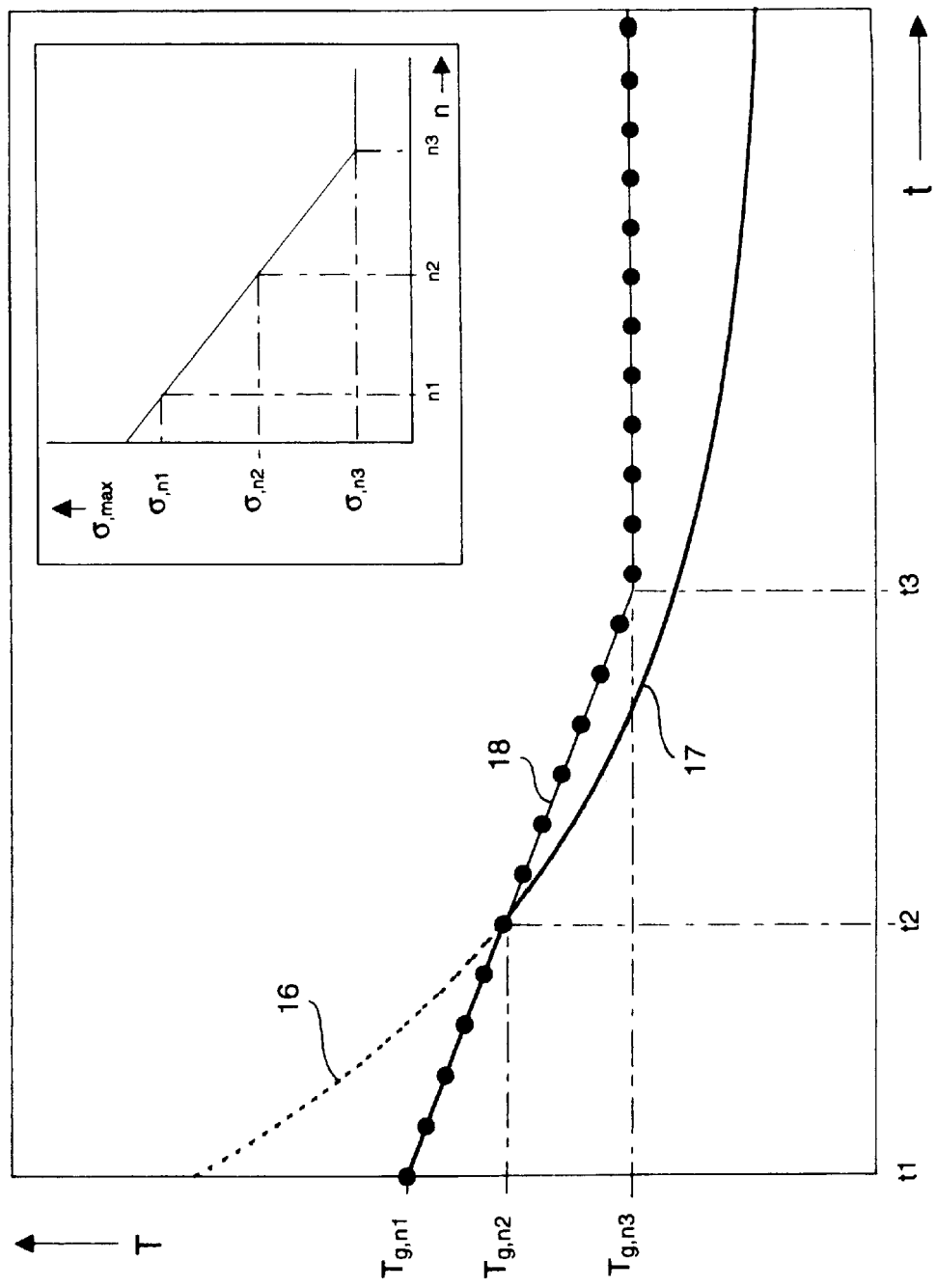
FIG. 3b shows a graph which diagrammatically illustrates a curve of the torque on the primary shaft as a function of time for the "full stall" state, for a drive device provided with limiting means according to the invention.

FIG. 3b shows a graph in which a torque T is depicted on the vertical axis and time t is depicted on the horizontal axis. For a drive device according to the prior art, the curve 16 illustrates the relationship between the torque Tp which can be generated by the combination of engine 1 and torque converter 2 on the primary shaft 3b and the time t during acceleration of the primary shaft 3b from the "full stall" state. If the drive device is provided with the limiting means 6,8 and 9 according to the invention, the torque Tp on the primary shaft 3b can be limited in such a manner that the torque Tp which is actually generated on the primary shaft 3b follows the curve 17. The limit level Tg is indicated by the dot-dashed line 18 and is related to the fatigue curve, shown as an inset, of the drive belt 3a. The number of revolutions n of the drive belt 3a is directly proportional to the product of the time t and the rotational speed Np of the primary shaft 3b, the proportionality constant depending on the transmission ratio of the transmission unit 3.

At the beginning of the acceleration, at time t1, the limit level Tg is equal to Tg,nl, where Tg,nl is related to the maximum belt load, at a low number of revolutions n of the drive belt 3a. Since the number of revolutions n of the drive belt 3a increases proportionately to the time t, the maximum permitted load on the drive belt 3a falls in accordance with the fatigue curve of the drive belt 3a. The limit level Tg is adjusted by the limiting means 6,8 and 9 in such a manner that said maximum permitted load cannot be exceeded. At time t2, Tp has become equal to Tg, and from that moment on the limiting means will no longer act on parts of the drive device.

We claim:

1. A drive device for an engine-driven load comprising, in the drive direction:

an engine;

a torque converter with an input shaft and an output shaft;

a continuously variable transmission unit with a primary shaft and a secondary shaft adapted to transmit torque with the aid of friction forces, the combination of the engine and the torque converter on the primary shaft of the transmission unit being capable of generating a nominal torque (Tp,nom) greater than the maximum slipping torque (Ts,max) of the continuously variable transmission unit; and a limiting means operatively connected to at least one of the engine and torque converter to limit the torque (Tp) actually generated in operation by the combination of the engine and the torque converter on the primary shaft of the transmission unit to not exceed a defined limit level (Tq), wherein the engine and the torque converter are designed such that the nominal engine torque times the square root of the torque conversion factor (f) is approximately equal to the maximum slipping torque (Ts,max) of the transmission unit.

2. Drive device according to claim 1, wherein the limit level (Tg) is essentially equal to the maximum slipping torque (Ts,max) of the transmission unit when the transmission unit is set to a transmission ratio associated with the lowest possible rotational speed of the secondary shaft.

3. Drive device according to claim 1, wherein the limit level (Tg) is variably dependent on at least one of the temperature of the transmission oil, the transmission ratio of the transmission unit, the rotational speed of the engine (Ne), the acceleration of the primary shaft of the transmission unit and the number of revolutions (n) of the primary shaft.

4. Drive device according to claim 3, wherein the limit level (Tg) is dependent on the number of revolutions (n) of the primary shaft of the transmission unit from stand still, and the limit level (Tg) decreases as the number of revolutions (n) of the primary shaft increases.

5. Drive device according to claim 1, wherein the continuously variable transmission unit is provided with a primary pulley on a primary shaft and a secondary pulley on a secondary shaft and with a drive belt arranged around the two pulleys, the pulleys each being provided with two conical discs, at least one of which can be displaced axially with the aid of displacement means, so that the radial position of the drive belt between the discs, and hence the transmission ratio of the transmission unit can be set in a continuously variable manner within a defined range, and in which the maximum slipping torque of the drive belt is the defining criterion for the maximum transmittable torque of the transmission unit.

6. Drive device according to claim 5, wherein the drive belt is made essentially of metal, and the limit level (Tg) is dependent on the number of revolutions (n) of the primary shaft of the transmission unit from stand still to maintain the limit level (Tg) in correspondence the fatigue curve of the drive belt.

7. Drive device according to claim 1, wherein the limiting means firstly comprise measurement means for generating one or more measurement signals for determining the torque Tp on the primary shaft of the transmission unit, secondly comprise signal-processing means for generating one or more control signals, on the basis of said measurement signals, for controlling the torque (Tm) generated by the engine, and thirdly comprise actuation means for limiting, on the basis of said control signals, the torque (Tp) which is generated in operation by the combination of engine and torque converter on the primary shaft of the transmission unit.

8. Drive device according to claim 1, wherein the limiting means comprise sensors for detecting the rotational speed (Ne) of the input shaft of the torque converter, the rotational speed (Np) of output shaft of the torque converter and for detecting the position ($\alpha$) of the accelerator pedal.

9. Drive device according to claim 1, wherein the limiting means limit the level of the fuel supply ($\beta$) to the engine.

10. Drive device according to claim 1, in which the torque converter is provided with a torque converter lockup clutch, wherein the limiting means affect the torque converter lockup clutch of the torque converter.

11. A drive device for an engine-driven load comprising, in the drive direction:

an engine;

a torque converter with an input shaft and an output shaft;

a continuously variable transmission unit with a Primary shaft and a secondary shaft adapted to transmit torque with the aid of friction forces, the combination of the engine and the torque converter on the primary shaft of the transmission unit being capable of generating a nominal torque (Tp,nom) greater than the maximum slipping torque (Ts,max) of the continuously variable transmission unit; and a limiting means operatively connected to at least one of the engine and torque converter to limit the torque (Tp) actually generated in operation by the combination of the engine and the torque converter on the primary shaft of the transmission unit to not exceed a defined limit level (Tq), wherein the limiting means are activated in a low speed range of the rotational speed of the load.

12. A drive device for an engine-driven load comprising, in the drive direction:

an engine;

a torque converter with an input shaft and an output shaft;

a continuously variable transmission unit with a primary shaft and a secondary shaft adapted to transmit torque with the aid of friction forces, the combination of the engine and the torque converter on the primary shaft of the transmission unit being capable of generating a nominal torque (Tp,nom) greater than the maximum slipping torque (Ts,max) of the continuously variable transmission unit; and a limiting means operatively connected to at least one of the engine and torque converter to limit the torque (Tp) actually generated in operation by the combination of the engine and the torque converter on the primary shaft of the transmission unit to not exceed a defined limit level (Tg), in which the torque converter is designed with an adjustable torque conversion factor (f), and wherein the limiting means limit the torque conversion factor (f) of the torque converter.

* * * * *